(12) United States Patent
Huggans (10) Patent No.: US 7,640,892 B2
(45) Date of Patent: Jan. 5, 2010

(54) NAIL AND CLAW QUICK DETECTION APPARATUS AND METHOD

(76) Inventor: Marl Lee Huggans, 6012 Cervines, Austin, TX (US) 78735

( * ) Notice: Subject to any disclaimer, the term of this patent is extended or adjusted under 35 U.S.C. 154(b) by 290 days.

(21) Appl. No.: 11/561,789

(22) Filed: Nov. 20, 2006

(65) Prior Publication Data

US 2007/0163514 A1 Jul. 19, 2007

Related U.S. Application Data

(63) Continuation-in-part of application No. 10/884,239, filed on Jul. 2, 2004, now Pat. No. 7,137,356.

(51) Int. Cl.
*A01K 13/00* (2006.01)
(52) U.S. Cl. .................................................. 119/601
(58) Field of Classification Search ............... 199/601, 199/610, 650; 132/73.5, 75.4, 75.5; 30/26–29, 30/123, 175, 179; 606/165, 175; 119/601, 119/610, 650
See application file for complete search history.

(56) References Cited

U.S. PATENT DOCUMENTS

| | | | | |
|---|---|---|---|---|
| 4,213,460 A | * | 7/1980 | Weiner | 606/131 |
| 5,996,460 A | * | 12/1999 | Waite | 83/520 |
| 6,915,576 B2 | * | 7/2005 | Brzezinski | 30/34.05 |
| 7,000,321 B1 | * | 2/2006 | Rodgers | 30/29 |
| 7,124,669 B1 | * | 10/2006 | Rodgers | 83/13 |
| 7,131,448 B2 | * | 11/2006 | Lund et al. | 132/73.5 |

* cited by examiner

*Primary Examiner*—Thomas Price (57) ABSTRACT

A detection device for the quick of an animal claw incorporates a sensor device and scan system technology into a handheld device that locates the location for a proper cut, avoiding cutting the quick and avoiding pain to the animal. The scan system technology may include a light sensor, an infrared sensor, a laser sensor, an ultrasonic sensor, or an intensity transducer. A control circuit determines the position status of the device and applies a mark on the claw to designate a position that is safe to clip in order to avoid the quick of the claw.

11 Claims, 8 Drawing Sheets

NAIL AND CLAW QUICK DETECTION APPARATUS AND METHOD

RELATED APPLICATIONS

This application is a continuation-in-part of US patent application Ser. No. 10/884,239 filed Jul. 2, 2004 by applicant, scheduled to issue as U.S. Pat. No. 7,137,356 on Nov. 21, 2006. That application and drawings are incorporated by reference.

BACKGROUND OF THE INVENTION

Background

1. Field of the Invention

This invention relates to the field of pet and animal grooming, particularly claw trimming.

2. Discussion of the Related Art

Animals' claws are constantly growing and domesticated animals typically do not have a lifestyle where their claws are worn down by a natural process. As a result a pet's claws can grow to an uncomfortable and unhealthy length if not kept in check by regular clipping or trimming. The terms clipping and trimming are used extensively herein, and are used interchangeably and always mean to remove a portion of claw by a cutting device.

Conventional animal nail and claw clippers are widely used and typically perform as intended. There are several problems associated with these devices. They do not determine the actual length and location of the quick. The operator does not know exactly how short to trim the claw until it is trimmed too short. In addition, the length of the quick is not always constant from animal to animal. There may also be some variation within an animal from claw to claw. These devices do not account for these variations and cannot make proper adjustments. Attainment of the proper or right amount of claw to be considered excess while preserving the integrity of the internal quick has been "hit or miss" at best. Until now, trimming an animal's claw has always required extreme care to avoid injury to the animal and yet often the animal is injured none-the-less. In fact, because of multiple factors such as unskilled pet owners, poor eyesight and most of all opaque claws it is often impossible to safely clip an animals claw every time. As such, there is substantial room for improvement.

References made to an animal's claw means a claw or nail that contains a quick. By the term quick, it means that structure internal to the animal's claw that has blood flow as known to those skilled in the veterinary arts. The term claw and the term nail are used interchangeably and are understood as defined by veterinary science.

Historically, although widely used, all conventional nail & claw clippers for family pets and domesticated animals share the same major shortcoming. Whether hand actuated, manually operated or motor driven, traditional claw and nail clippers have routinely caused injury to the animal by cutting into the quick of the claw. Cutting of the animals quick results in discomfort, pain, and bleeding. Unfortunately for the pet, the misalignment of the cutters (resulting in the animals quick to be penetrated), occurs often by the actions of both the pet owners (the non-specialist), by para-skilled (Veterinarian technicians) and by the specialist themselves (licensed Veterinarian) because the animals quick can be difficult to locate in a clear-colored claw and virtually impossible to locate visually in an opaque claw. Conventional clippers with a so-called mechanical positioning device or adjustable stop do not solve the problem either. They merely pre-determine or standardize the cutting length chosen and in that regard may be more detrimental to the animal's health if the wrong cutting length is chosen. And therein lies the crux of the problem of all currently available claw clippers—they all rely on the clipper operator visually locating (the eye ball test) the appropriate distance from the quick to clip the excess claw or, worse yet, with a claw that the quick is not readily exposed to guess at the quick's location before for attempting cutting excess claw. Unfortunately, pet owners and professional animal caregivers alike are wrong in this estimate too many times. The secondary fallout from this error in judgement is the development of negative feelings in the animal's for the claw trimming process. Once the negative experience occurs and is associated with the nail clippers the animals resist having their claws clipped at the sight and recognition of the clippers-increasing the difficulty of the clipping process and increasing the likelihood of error and accidents.

The prior art nail gauging devices and positioning structures for nail clippers amount to a fixed or adjustable mechanical stop, plate, structure or arm that allow the operator a given length or allow the operator to fix a uniform length of claws to clip. None of the devices or improvements actually locate the position of the quick in the claw nor do they calculate and determine safe cutting point, i.e. a point that does not violate an animal's quick.

SUMMARY OF THE INVENTION

There is a need for the following embodiments. Of course, the invention is not limited to these embodiments.

The invention may have the effect of reducing the fear level in animals and increasing the comfort level among clipper operators with accurate knowledge on when it is safe to clip and reduce the likelihood of causing injury to the pet.

The invention overcomes the shortcomings of prior art devices. The invention may incorporate a sensor device and scan system technology into a hand-held trimming device that locates the location for a proper cut, avoiding cutting the quick and avoiding pain to the animal. Scan system technology may include a device whereby the claw is scanned by one or more scan systems such as, for example, the ones described herein. The results of the scan are sent (FIG. 13) from the scanhead sensor (1) via electronic signal to a control circuit (2). The control circuit determines the "position status" of the cutting device and via audible (4) and or visual alert (3) tell the clipper operator that the clippers are positioned in either an unsafe zone or a safe zone for cutting/trimming the animals' claw allowing the operator to adjust position if necessary or execute a cut as desired. Another variation is to indicate the position status via display window (5) described later. The control circuit may be, for example, a microprocessor. A power source (6) is provided.

The scan system technology can alert the clipper operator of the safe cutting zone (away from the quick) i.e. indicating when it is safe to actuate the clippers and also alert the operator when he/she is in an unsafe zone of the claw (too close to or at the quick), and, in one variation, provide a safety means to prevent clipper actuation, such as with a dead bolt action.

As a direct result of this invention, the aforementioned injuries that occur to pets and other animals during the nail and claw clipping procedures are eliminated by the scan system technology. By the means of the invention an individual, whether untrained in the veterinary arts, such as a pet owner or a highly skilled person in veterinary arts such as a licensed veterinarian can now easily, safely and quickly locate a desirable point to trim animals claw without the worry or hesitation normally associated with conventional clippers.

These, and other, embodiments of the invention will be better appreciated and understood when considered in conjunction with the following description and the accompanying drawings. It should be understood, however, that the following description, while indicating various embodiments of the invention and numerous specific details thereof, is given by way of illustration and not of limitation. Many substitutions, modifications, additions and/or rearrangements may be made within the scope of the invention without departing from the spirit thereof, and the invention includes all such substitutions, modifications, additions and/or rearrangements.

BRIEF DESCRIPTION OF THE DRAWINGS

The drawings accompanying and forming part of this specification are included to depict certain aspects of the invention. A clearer conception of the invention, and of the components and operation of systems provided with the invention, will become more readily apparent by referring to the exemplary, and therefore nonlimiting, embodiments illustrated in the drawings, wherein like reference numerals (if they occur in more than one view) designate the same or similar elements. The invention may be better understood by reference to one or more of these drawings in combination with the description presented herein. It should be noted that the features illustrated in the drawings are not necessarily drawn to scale.

DETAILED DESCRIPTION

Element List (1) scanhead sensor
(2) control circuit
(3) visual alert
(4) audible alert
(5) display window
(6) power supply or source
(7) status lights
(9) claw-receptacle cutting guide
(10) blade
(11) spring
(20) thermal detector
(21) light source
(22) photodiode
(24) handle
(25) battery
(26) microprocessor
(27) LED
(28) display screen
(32) laser
(31) pick up device (photo-element)
(101) extended tip
(102) spring
(103) scan-head marking pen
(104) sleeve-like housing
(105) solenoid device
(107) microprocessor controller
(108) threaded end cap
(109) cable
(110) alligator clip
(111) latching device
(200) animal's claw
(201) excess claw
(210) quick
(300) reflected wave The invention and the various features and advantageous details thereof are explained more fully with reference to the nonlimiting embodiments that are illustrated in the accompanying drawings and detailed in the following description. It should be understood that the detailed description and the specific examples, while indicating specific embodiments of the invention, are given by way of illustration only and not by way of limitation. Various substitutions, modifications, additions and/or rearrangements within the spirit and/or scope of the underlying inventive concept will become apparent to those of ordinary skill in the art from this disclosure.

One advantage of the invention is its ability to provide accurate, safe and proper location to place the cut made to remove excess claw in said pet or animal. This invention may provide an integrated scanning device and system for conventional styled claw clippers including but not limited to those that incorporate traditional mechanical nail positioning structures or positioning devices.

This invention provides its advantages in an easy to operate, fluid manner.

This invention lowers the bar of requisite experience, training and skill of the clipper operator so that non-skilled operators can perform safe and accurate trimming of an animals' nails. This invention reduces the skill level required to safely clip an animals claws to that of the average pet owner, and for non-domesticated animals with claws containing a quick, to the level of the para-skilled in veterinary science.

This invention reduces the stress created for the pet owner or individual operator of clippers that results from the clipping process performed poorly. The stress caused by hurting one's own pet or the likelihood of the same has prevented many owners from even attempting to maintain a healthy claw length for their pet, and as a result of this avoidance, pets go uncared for in this manner to avoid potential injury to the pet.

It should be understood that this invention can be integrated with manually operated clippers such as hand actuated clippers and that this invention can be integrated with battery powered clippers or standard household current driven motorized clippers.

In one embodiment, the invention uses scan system technology to accurately locate the position of the quick in real-time or near real-time permitting the identification of the excess claw (201) and identification of claw containing the quick. This provides to the individual pet owner and the veterinary industry a vastly improved success rate by indicating to the clipper operator via visual and/or audio alerts and/or by LCD or LED display when it is safe to trim the animal's claw. Alternatively, the clipper may be configured to automatically clip a nail (i.e., without an alert) once it determines that the quick will not be impacted. The inventions' user interface design is user friendly, intuitive and operates in a similar fashion to traditional/conventional claw clippers so that no new protocol is required and so that the clipper operator can work in the manner in which he/she is accustomed.

Figure 10:
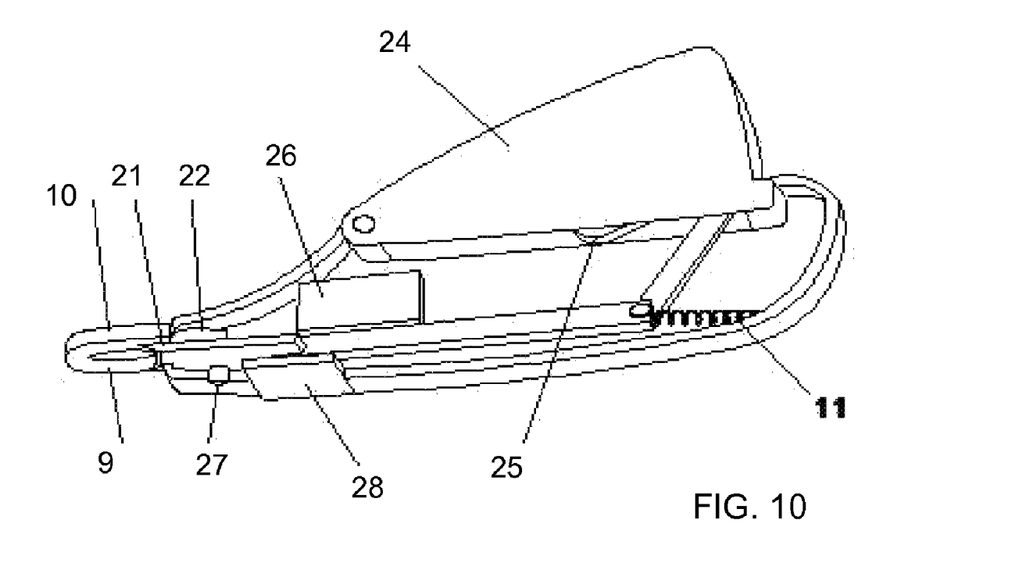
FIG. 10 shows a cutaway view line illustration of the embodiment of the invention integrated in a molded enclosure from a slight underneath side view perspective.

In one embodiment, a system includes a scanning device and system (FIG. 13) integrated and mounted to conventional clippers including a scan head, probe or sensing device (1) (described later) linked via cable or pins to a dedicated microprocessor (2) (described later) comprised of firmware and/or software logic, visual (3) and audio (4) alerts, on/off switch, power source (hereafter referred to as the "scan system"). The scan system may be integrated (FIG. 10) into the body and handle of the clippers with the scan head positioned and oriented in a relative manner of a known distance with the cutting mechanism as to allow the firmware/software to process the scan information of the claw and indicate via the systems' alerts in real time or near real-time when the cutting edge of the clippers rests in the desired area (safe zone) of the excess claw to be clipped.

The scan head can be permanently affixed in a desirable, predetermined position of a known distance to permit the microprocessor to calculate accurately the location of the clippers cutting edge relative to the quick, thereby allowing proper alignment of said cutting edge.

In one embodiment, if the microprocessor determines the cutting edge is positioned in an unsafe area the microprocessor can actuate a fail-safe mechanism such as a stop plate, deadbolt or mechanical disengagement of the cutting edge actuator to further insure against accidental engagement of the clipper at an improper time, i.e., position. Also, for the electric or motor driven clipper, the fail-safe mechanism could be electronic disengagement of the cutting mechanism.

Figure 11:
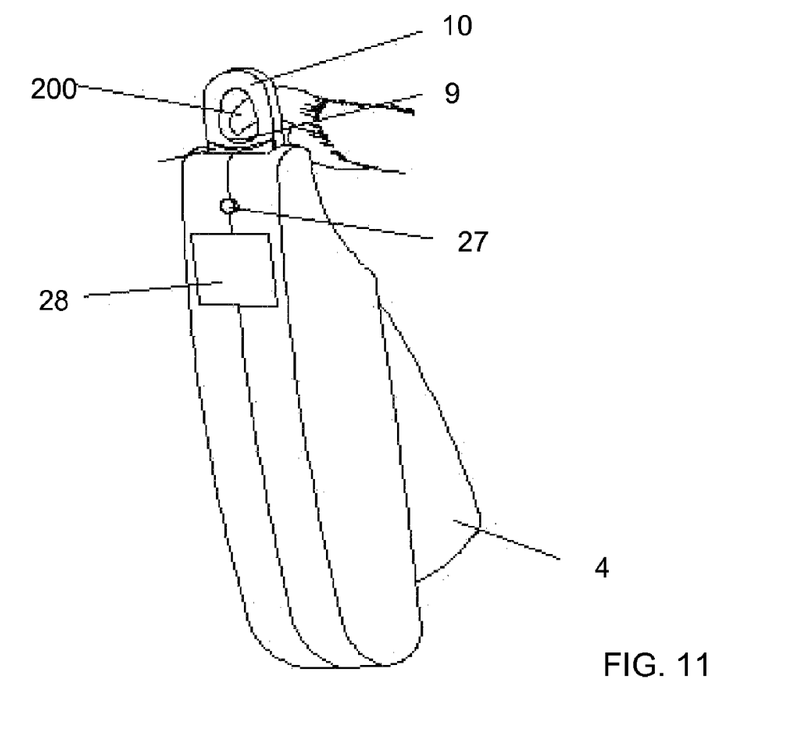
FIG. 11 is a line illustration of an embodiment of the invention in a molded enclosure demonstrating the animals' claw in the nail cutting guide with the excess claw protruding beyond the cutting edge of the clippers from an underneath view perspective.

The unit may be powered on and off by a switch. When the clipping operation is to be performed, the unit is switched on. (FIG. 11) The device's claw-receptacle (9) (described later) is placed over the claw to be clipped. The operator views the position status lights (7); if (a) the unsafe zone light and unsafe audible alerts activate (explained later) then the operator will know to move the device slowly in the direction as to move the claw outward of the units claw receptacle until such time as the safe zone visual alert and the safe zone audible alert activate indicating the unit is now positioned for proper and safe trimming of said claw. Thereby executing a "good" trim procedure and preventing penetration of the quick by the units' cutting edge. (b) if, at first attempt, the safe zone visual alert and safe zone audio alert activate, indicating safe positioning of the clippers over the animals' claw, the operator may activate the clippers' cutting device without further alignment or positioning of the cutters and produce safe results. In an alternative embodiment in which alerts are not utilized, the operator may simply move the clipper along the claw; when the system determines it is safe to cut, the cutting device may be activated automatically.

The term "safe zone" means an area of claw distanced from the quick. The safe zone includes excess claw extending outwardly from the quick to the external tip of the animals claw. The term "unsafe zone" means an area of the claw that includes the internal structure known as the quick as understood by those of ordinary skill in the art and an area past the quick required to sufficiently protect the quick, also as understood by those of ordinary skill in the art, such as the veterinary arts.

The safe zone visual light alert can include a conventional light or conventional LED. The safe zone audible alert can include a conventional miniature speaker or buzzer. The safe zone visual light alert and safe zone audible alert (referred to jointly as the "safe alerts") can activate jointly. When the safe alerts activate, that is an indication that it is safe to actuate the clipper mechanism thereby initiating the cutting stroke. The unsafe zone visual light alert can include a conventional light or conventional LED. The unsafe zone audible alert can include a conventional miniature speaker or buzzer. The safe alerts can differ distinctly from the unsafe alerts: First, the visual safe and unsafe alerts may differ in color (such as red for unsafe and green for safe), intensity, and also in position on the device so as to distinguish them by location on the device and by physical distance between them. Second, the audible safe and unsafe alerts can differ distinctly from each other in note, pitch, volume, intensity and well as pleasantness to the ear.

The microprocessors' firmware/software can be programmed in accordance with the conventions used by those of ordinary skill in the art, such as the area of digital electronic data scan and acquisition systems, to coordinate data received from the scan head sensors, process the data, and deliver real-time or near-real-time signals to the visual/audio alerts or LCD display as the case may be.

By the term "near-real-time," it is meant that the scanhead sensor is able to scan and the microprocessor is able to analyze and signal the user within a time sufficient for the operator to clip the animal's claws in the manner in which those skilled in the art of veterinary medicine are accustomed. Response time from conventional commercial sensors offer response times of 150 mSec, which are more than sufficient to display near real time status of the device position.

The scan system (FIG. 13) includes scan technologies (described later) where a sensor head (1) is connected to the systems main electronics (2). The systems' main electronics include a microprocessor containing firmware/software capable of monitoring the sensor head for desired values and also capable of signaling various electronic alerts (3&4) at the recognition of desired values and recognition of undesired values. The main electronics are also capable of signaling an LED display (5).

There are several scan technologies that could be utilized and incorporated into the device to help determine the location of the quick. These include, but are not limited to, 1) thermal radiation, 2) ultrasonic waves, 3) pulse oximetry, 4) high intensity light source 5) coherent light source and pickup device and 6) infared thermometer.

Figure 2:
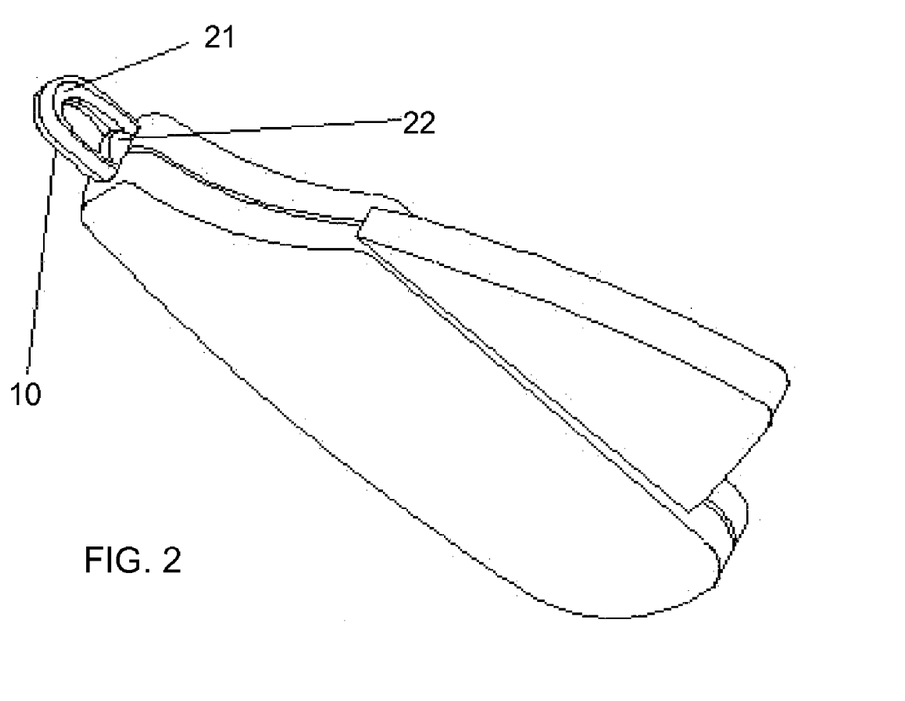
FIG. 2 shows another embodiment of the invention integrated in a molded enclosure from a top down side elevation perspective.
Figure 14:
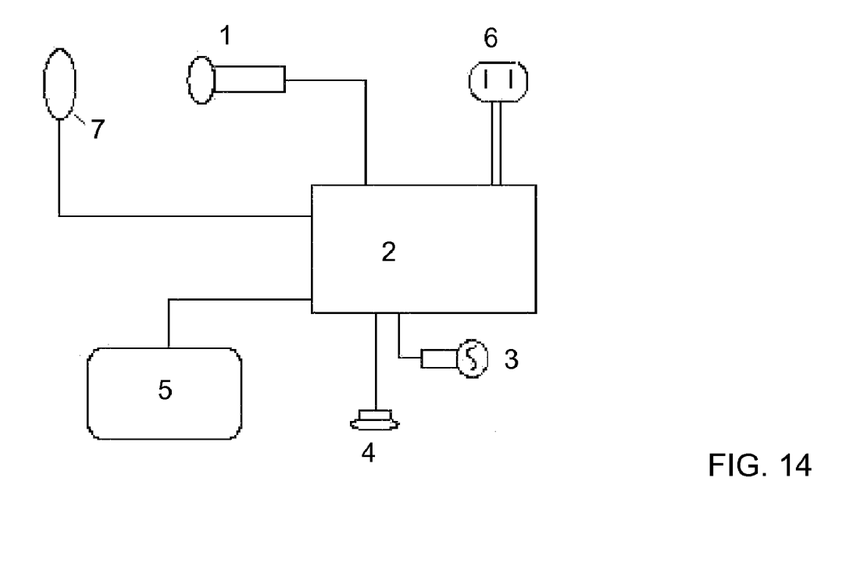
FIG. 14 shows a schematic plan view of an embodiment of the invention's scan system technology illustrating another embodiment of the invention incorporating a pick-up source in conjunction with the scan head sensor and the collection of data.

One embodiment of the current invention, (FIG. 2) uses a spectral analysis system incorporating a high intensity light source (21) used for determining the physical properties of the animal's claw by measuring the optical characteristics of the source light emitted from the claw propagating onto an optical pickup spectrometer and thereby providing the control circuit with sufficient data to indicate to the operator that it is safe to cut the animal's claw. A photodiode (22) can also be used to help determine the location of the quick (e.g., in a dog's claw). This technique is based upon the fact that light will pass more freely through the material in a dog's claw than through the claw with the quick. A high intensity light (1) is focused onto the surface of the claw, and a photodiode is positioned on the opposite side of the claw to pick up the light that passes through. There is a measurable difference in the amount of light that the photodiode (2) registers when the light is focused on a section of claw containing quick and a section of claw without quick. It is this difference in received light that is used to determine a safe trimming location. In a further embodiment, the invention (FIG. 9) incorporates a high intensity light source (1) coupled with a photodiode (2) to accurately and repeatedly determine the location of termination of the quick in a claw to aid in proper trimming. The mechanical cutting action of the clipper (FIG. 10) mimics many of the guillotine style trimmers currently on the market. Actuating force is supplied manually via the handle (24), and a battery (25) is used to supply all the necessary power for operating the light detection system. A microprocessor (26) is used to read and analyze the data received from the photodiode. In addition, it controls the output displayed through the LED (27) and the display screen (28). The scan system in FIG. 14 illustrates the technology schematic for this embodiment.

An embodiment of using this device is described in the following: (FIG. 10) the first step is for the operator to turn on the device and wait for a ready signal to appear in the display window. In addition, the LED lights up red, and the display screen shows an indicator of the battery power level. The animal's claw is then completely inserted into the cutting guide (9); the tip of the animal's toe should be flush with the cutting guide. At this point, the display screen shows a message alerting the operator that it is reading sensor data. The operator slowly moves the device distally along the length of the claw until the LED turns green and the display screen gives a safe message. At this time, the operator depresses the handle and the blade (10) trims the animal's claw. Then, the spring (11) returns the handle and the blade to their original positions.

Another exemplary embodiment using a high intensity light without a photodiode can also be used. The high intensity light is oriented and focused so that it is shining through the claw towards the user. A transparent visor or shield can be incorporated into the device to reduce emitting light intensities to a safe and acceptable level. The light can illuminate the claw to a level such that the user is able to visually determine the location of the quick.

Figure 1:
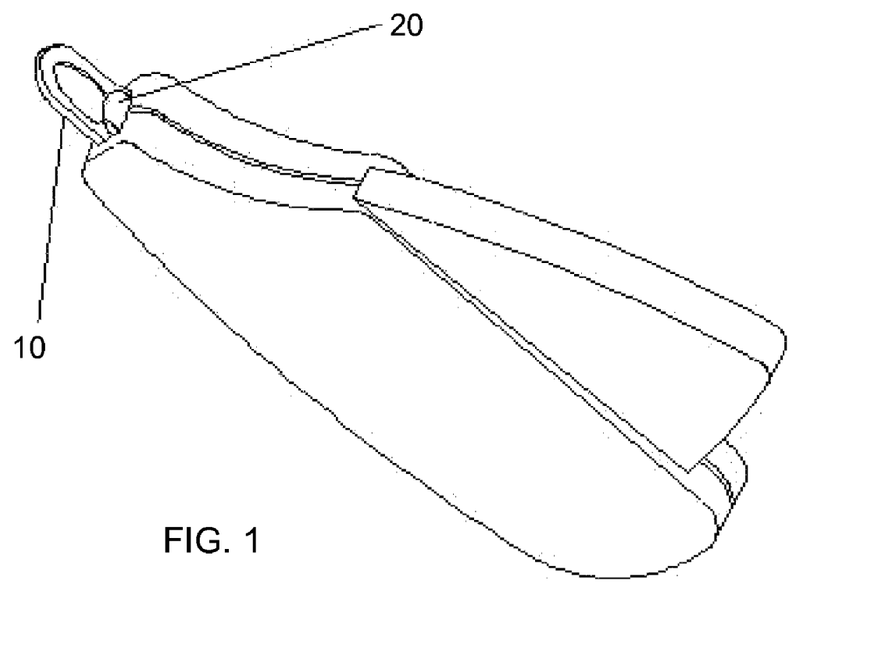
FIG. 1 shows an embodiment of the invention integrated in a molded housing enclosure in a top down side elevation.

In another embodiment, (FIG. 1) thermal radiation, also known as infrared radiation (IR), produces a measurable IR flux. The net IR flux is measured using a thermal detector (20) such as a thermopile or active far infrared detector. When detector is responsive to the presence of thermal radiation naturally emanating from the claw. Once the thermal detector is positioned over the portion of the animal's claw that does not contain the quick it will measure the drop in the net IR flux, thus allowing the control unit to indicate to the operator that it is safe to cut the animal's claw. These devices measure the temperature of an object on a non-contact basis by capturing and analyzing emitted thermal radiation. The quick in the claw (e.g., of a dog) has a blood supply that holds the temperature of the quick close to normal body temperature. However, the claw itself is not supplied with blood. Therefore, the temperature of the claw with the quick inside is slightly different from that of the rest of the claw. It is this difference in temperature that the IR thermal probe detects. IR technology provides a desired percentage level of accuracy, percent of repeatability, spectral response, response time and temperature range.

Figure 3:
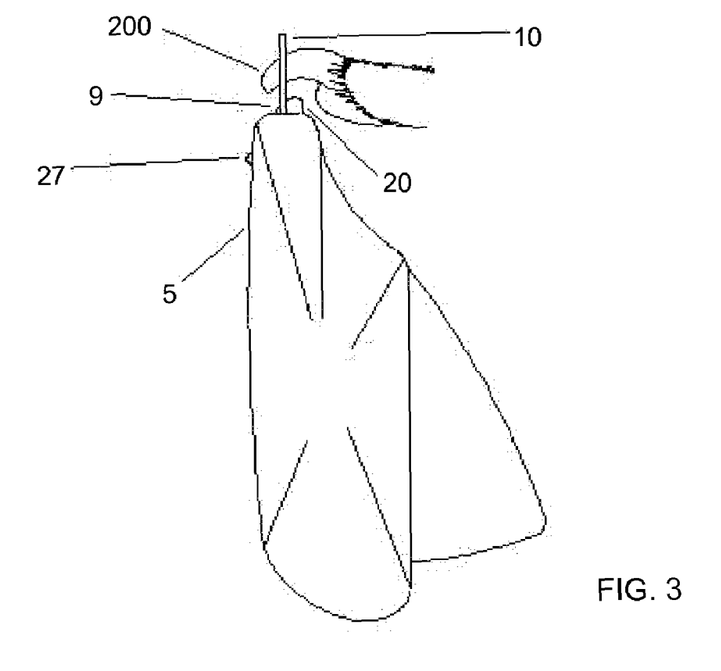
FIG. 3 illustrates the use and positioning of an embodiment of the invention with the animals' claw in direct side view perspective. The animal's claw is positioned in the cutting edge (note that the position of the animals quick is not readily apparent or visible).
Figure 4:
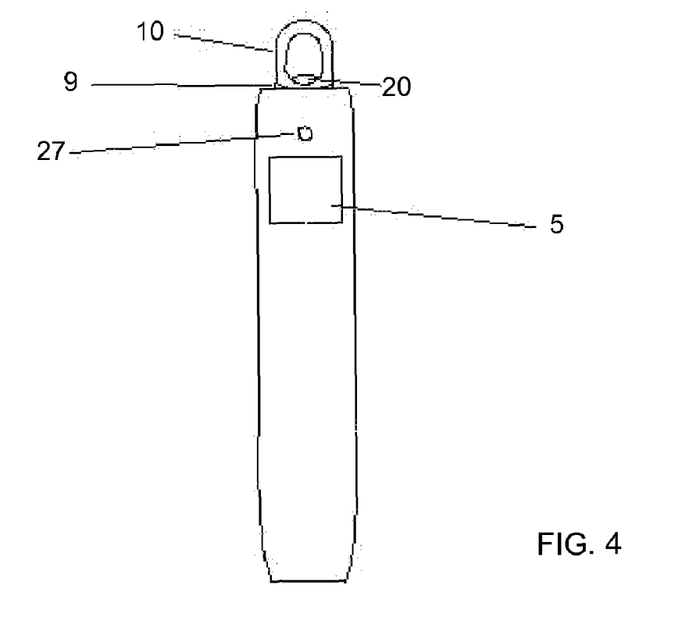
FIG. 4 demonstrates an embodiment of the invention in an enclosure in use with the animal claw placed within the clipper cutting guide from an underneath view perspective.
Figure 5:
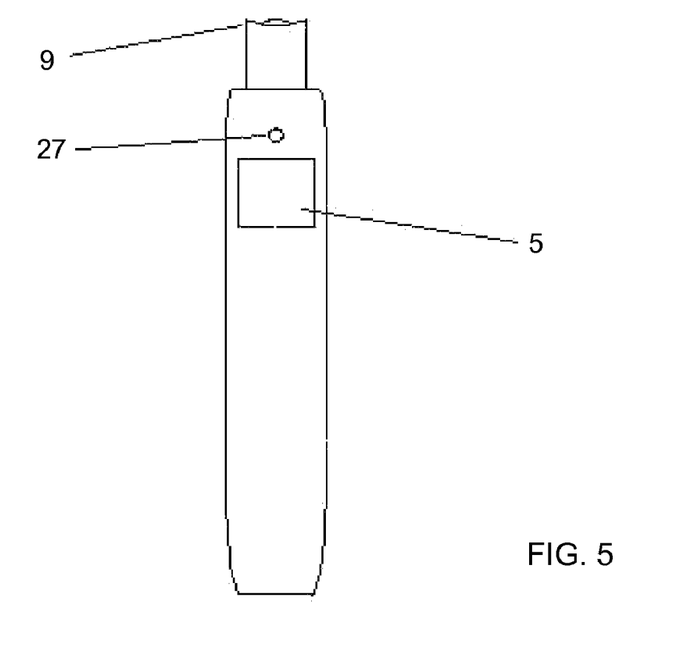
FIG. 5 demonstrates an embodiment of the invention in an enclosure in use with the cutting blade fully extended from actuation from an underneath view.
Figure 13:
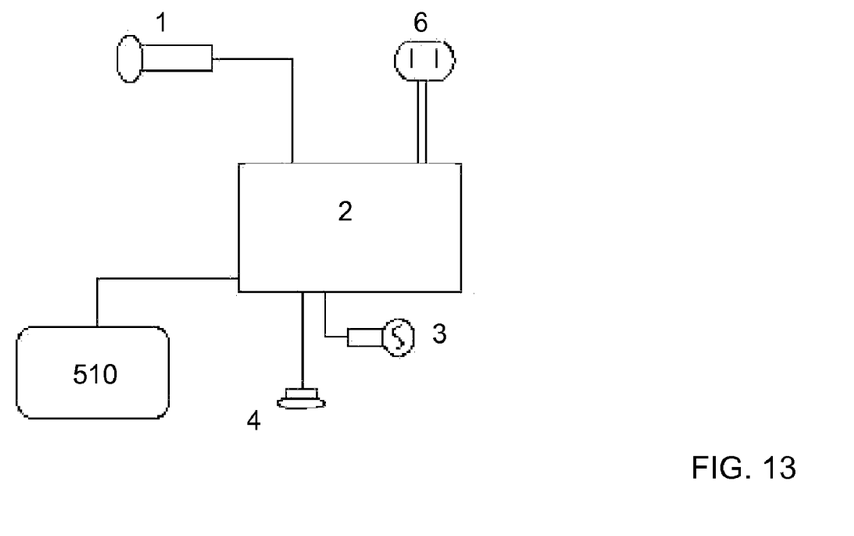
FIG. 13 shows a schematic plan view of an embodiment of the invention's scan system technology.

If the probe is focused on the surface of the claw above the quick (FIG. 3), it receives thermal radiation close to that of the animal's body temperature. Since there is a layer of nail surrounding the quick, the temperature the probe registers is slightly lower than that of the quick itself. When the probe is focused on the surface of the claw in an area where there is no quick underneath, the registered temperature may be significantly lower. In addition, as the probe is focused further away from the quick the difference in temperature will increase. A specified difference in temperature is then used to determine the proper location for cutting. The scan system plan in FIG. 13 illustrates the technology schematic for this embodiment.

Figure 7:
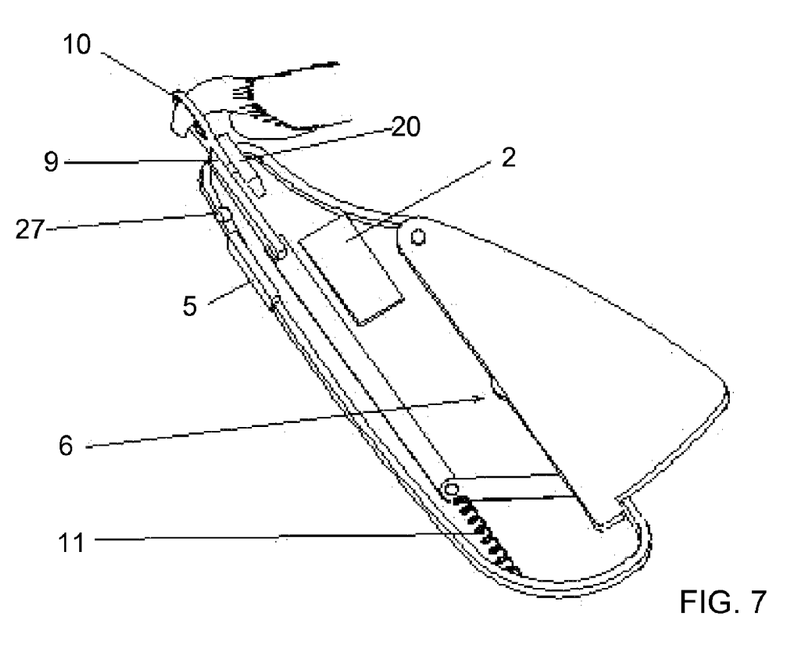
FIG. 7 shows a cut-away view of an embodiment of the invention demonstrating the device positioned with the animals' claw in the nail cutting guide prior to activation of the clipper cutting mechanism from a side view perspective.
Figure 8:
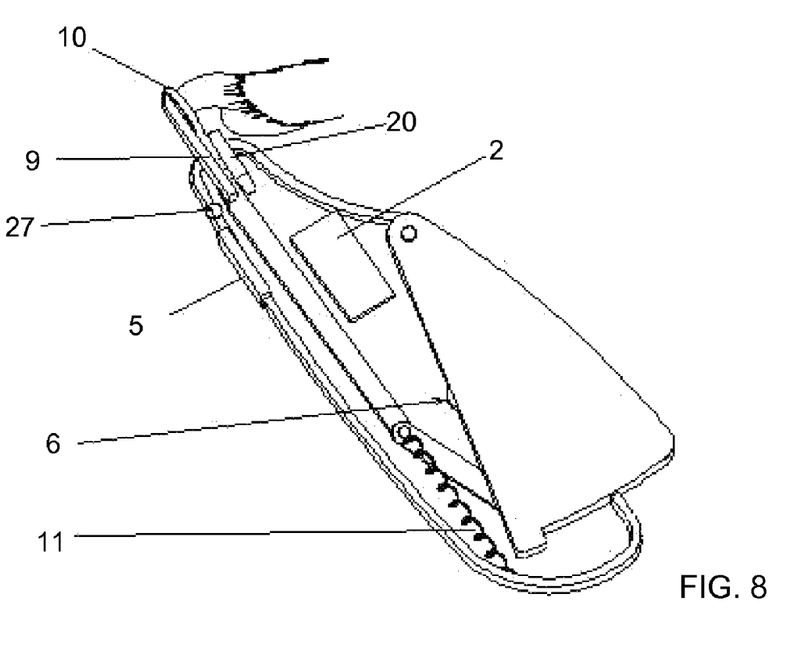
FIG. 8 shows a cut-away view of an embodiment of the invention demonstrating the device positioned with the animals' claw in the nail cutting guide after full activation of the clipper cutting mechanism from a side view perspective.
Figure 12:
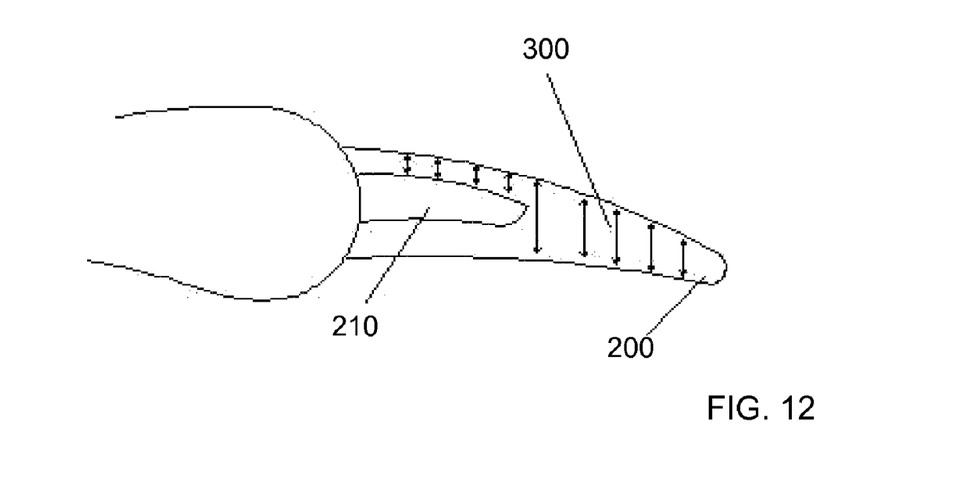
FIG. 12 shows an anatomical line illustration of an animals' claw demonstrating the ultrasonic frequencies radiating through the said claw and reflecting off the quick (210) structure and reflecting off the opposing wall of the excess claw in a cross-sectional view perspective.

In another embodiment, a small ultrasonic sensor (FIG. 7) is employed. In this embodiment, the device uses a standard B-mode or Doppler tissue imaging device to generate two-dimensional data of the claw structure and the quick within or by the cannulation of blood vessels located within the quick to provide signal data to the control circuit, thereby allowing the control unit to indicate to the operator that it is safe to cut the animal's claw. These devices emit ultrasonic waves that are bounced off of an object and then measure the time delay of the received reflected wave (300). When the sensor is placed in contact with the surface of the claw, the waves pass through the claw material freely until a change in medium is reached. This change in medium can either be the surface of the quick or the air on the opposite surface of the claw. By measuring this change in claw material along its length, the termination of the quick is located. It is located where a large jump in claw material is observed as illustrated in FIG. 12. In FIG. 12 the arrows in the claw structure represent the travel of the ultrasonic waves. The arrows can also be thought of as representing the thickness of the claw material. FIG. 12 helps to illustrate that the termination of the quick is located at a distinct increase in the distance of the travel of the ultrasonic waves. The integrated scan system can use this data to alert the clipper operator when it is safe to clip a said animal's claw. The scan system plan in FIG. 13 illustrates the technology schematic for this embodiment.

In another embodiment, a pulse oximeter (FIG. 10) is used. In this embodiment, the device uses a standard pulse oximetery, such as those used in patient monitoring is used to produce a frequency division multiplex optical signal that is transmitted through the animal's claw then signal impinges upon a detector configured to capture the signal for a control circuit to process the location of the animal's quick within the claw. The detector may determine the oxygen saturation level present in the blood located within the quick of the claw or other analytical values of transmission and absorption characteristics of the source signal transmitted through the claw and thereby alert the operator when it is safe to cut the animal's claw. This device is used to measure the percentage of hemoglobin in the blood that is saturated with oxygen. A source of light is emitted from the sensor (2) at two wavelengths—usually 650 nm and 805 nm though other wavelengths can be used. The hemoglobin in the blood partly absorbs the light in an amount that differs depending on the level of oxygen saturation. The sensor (2) uses the difference in absorption between the two wavelengths to determine the percentage of hemoglobin that is oxygenated. However, in the claw clipper device, the pulse oximeter simply determines the presence of blood below the surface of the nail. If the sensor registers a reading of oxygen saturation, blood and the quick are present beneath the sensor. On the other hand, if the sensor cannot register a reading, it is located in an area where there is no quick. This would signify a safe location to trim the claw. The scan system plan in FIG. 13 illustrates the technology schematic for this embodiment.

Figure 9:
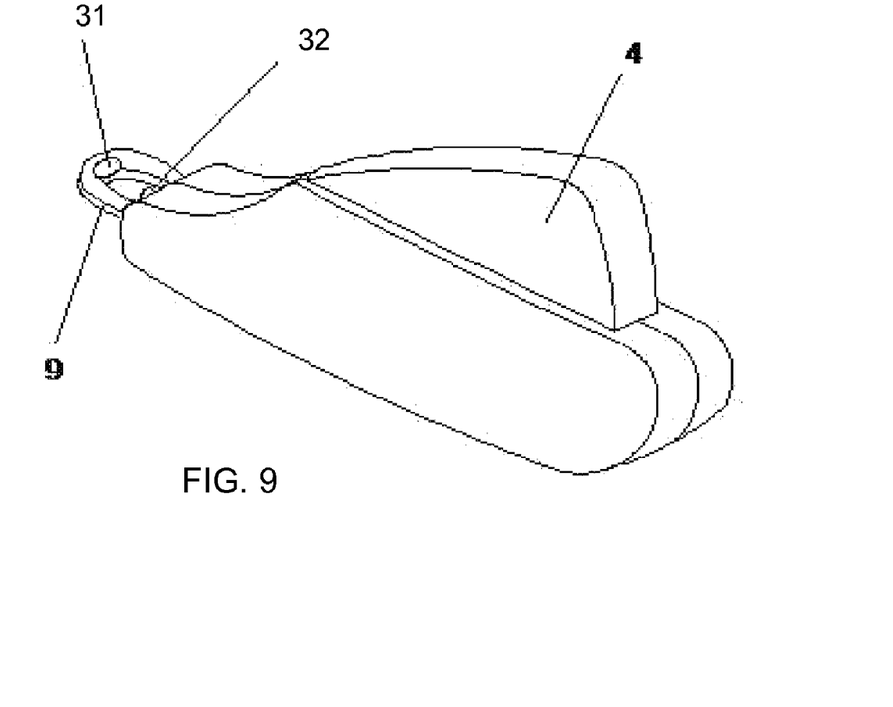
FIG. 9 is a line illustration of an embodiment of the invention integrated in a molded enclosure from a rear side view perspective.

In another embodiment, a coherent light source (FIG. 9, such as a laser (32) and a pick up device (photo-element)(31) such as photodiode is used to scan the animals claw. In this embodiment, the device uses coherent light source and pick up device: A coherent light source or probe is configured with collimation and aperture control in order to propagate the coherent light/laser beam across the animal's claw towards a pickup device. Data from the pickup device allows the control unit to locate the animal's quick and the non-quick of the animal's claw and thereby alert the operator when it is safe to clip the claw. One embodiment of the coherent light source design is to utilize a light source having a Mathieu-Gaussian intensity profile. The Mathieu-Gaussian light beam source used in conjunction with a diffraction filter generates a multidirectional raster pattern to provide the control circuit sufficient data to inform the operator when it is safe to clip the claw. Another embodiment of the coherent light source is an interferometric measuring device where a short coherent light source is directed by optical fiber using multiple-wavelength interferometry to determine the shape, distance, variations of the animal's claw and of the cavity of the quick providing the control circuit with sufficient data to alert the operator when it is safe to clip the claw. A light emitting transmitter (1) (referred herein as the scanhead) emits the laser light through the animals' claw (0). The photo element registers the change in electromagnetic radiation as the laser light moves distally across the claw containing the quick until it reaches termination of the quick and the remaining excess claw. The photo-element (1) sends a respective analog or digital signal to the microprocessor to analyze the data and activate the safe and or unsafe alerts as appropriate, thereby indicating when it is safe to trim the animal's claw. The scan system plan in FIG. 14 illustrates the technology schematic for this embodiment.

In another embodiment, (FIG. 1) an infared thermometer is used. In this embodiment, the device uses the Infrared (IR) thermometer operated by employing at least one IR sensor to measure the intensity of the IR radiation that naturally emanates from the animal's claw portion that contains the quick and the control unit microprocessor calculates the temperature from the data provided. Once the control unit recognizes a steady-state temperature from the IR sensor it is able to predict the presence or lack of the animal's quick based on the internal body temperature data of the animal. Utilizing a thermal detector such as those found in the standard human ear IR thermometer, the detector/sensor will typically have a detection wavelength range from 1000 to 40000 nanometers. In this example, an infared thermometer, such as those that are commercially available, comprising an intensity transducer sensor may be coupled to a control circuit. Such as the commercially available infared thermometers utilizing one or more primary light beams to collect data and determine position, distance and shape of said claw to be trimmed. Thereby sending a respective analog or digital signal to the microprocessor to analyze the data and activate the safe and or unsafe alerts as appropriate, thereby indicating when it is safe to trim the animal's claw.

In another embodiment, scan system technology positioning system is a tool or device independent of the claw clipper, to be used in conjunction with claw clipper where the device is used first to locate the position of the animal's quick, simultaneously marking the position of the quick with non-permanent ink or pigment dispenser or pen and thereby enabling the user to know where to properly clip the animal's claw.

In this embodiment, where the scan system technology positioning system is a tool or device independent of the claw clipper, to be used in conjunction with claw clipper where the device is used first to locate the position of the animal's quick, marking the position of the quick on the animal's claw, the scan-head of the scan system functions as both the scan-head and as a marking device such as an ink or pigment dispensing pen. The scan-head marking device combined unit is housed and operates in the same mechanical sense as a retractable writing instrument such as a ball point pen and retracts automatically immediately at the termination of the animal's quick thereby ending the marking function on the animal's claw. The retractable ball point pen as known in the art and is well disclosed.

Figure 6:
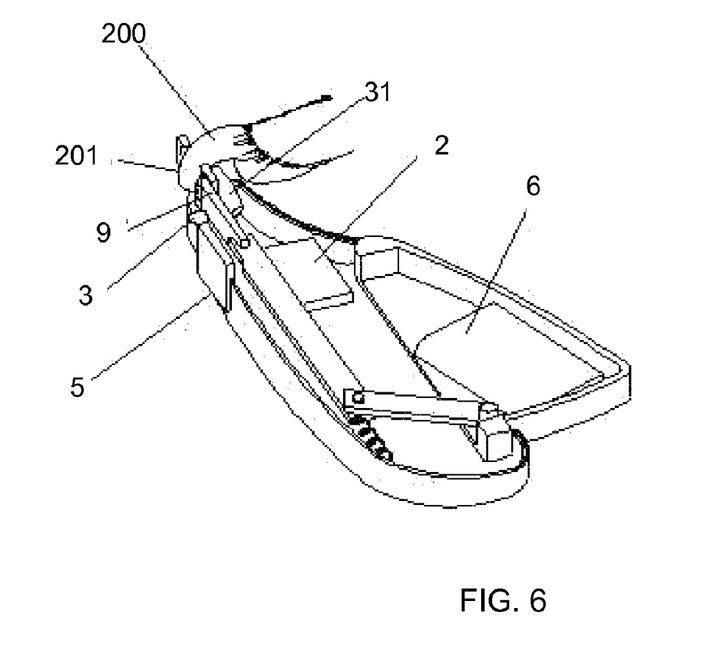
FIG. 6 illustrates a 3-dimensional cut-away view of an embodiment of the invention in a molded enclosure with the animal's claw in the cutting guide from a side view perspective.
Figure 15:
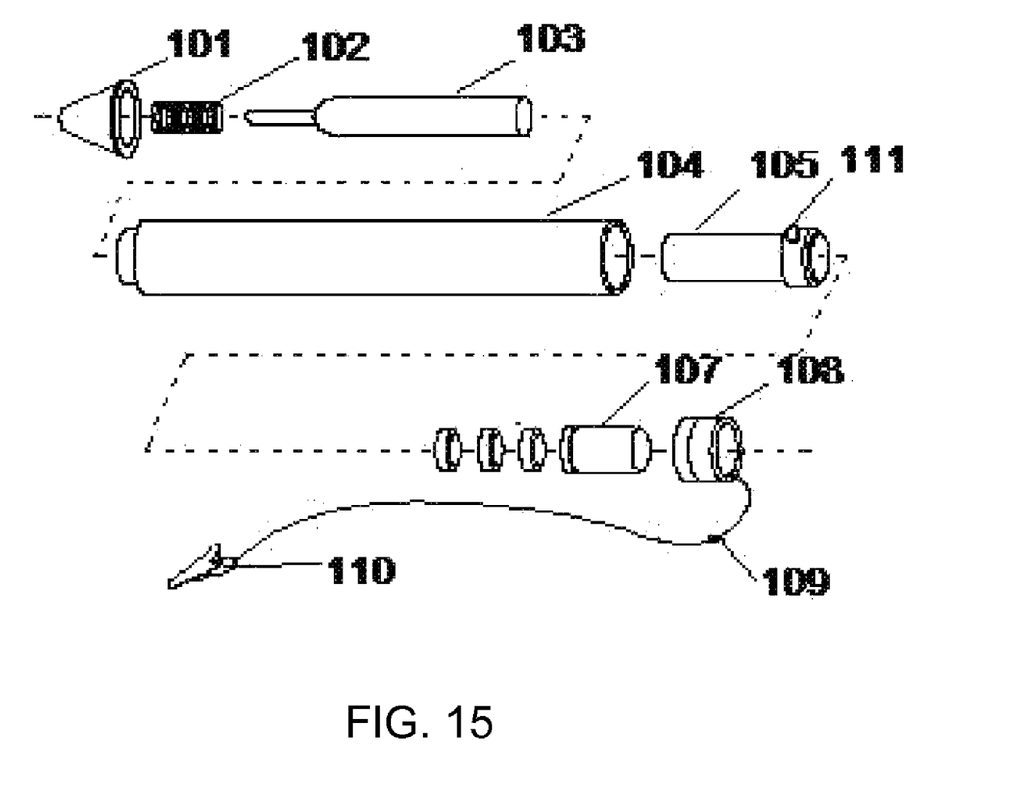
FIG. 15 is an exploded view of an embodiment of a quick marking device.

FIG. 15 is an exploded view of an embodiment of a quick marking device. In this embodiment, a scan-head marking pen (103) of the scan system is housed in a sleeve-like housing (104) with a reservoir axially extending in the housing whereto the scan-head marking pen retracts. A solenoid device (105) as known in the art and is well disclosed with latching device (111) for moving, latching and releasing the scan-head marking pen in scanning position (extended) and in the finished position (retracted) when marking the claw is terminated. The solenoid is controlled operated by the microprocessor controller (107) software and firmware. The unit is powered by batteries as shown in FIG. 6 or may be powered by household current and a step down transformer (not shown). The pen like unit is held together by a threaded end cap (108). The scan-head marking pen is returned to ready position, extended tip (101) outside the housing, and/or retracted when marking is complete either by the solenoid action itself or by the force of a spring (102).

In one embodiment, scan system technology positioning system is a tool or device independent of the claw clipper, to be used in conjunction with claw clipper where the device is used first to locate the position of the animal's quick, simultaneously marking the position of the quick with non-permanent ink or pigment dispenser or pen and thereby enabling the user to know where to properly clip the animal's claw, scan system technology may include a device whereby the claw is scanned by one or more scan systems such as, for example, the position of the animal's quick is determined by the passage of low voltage signal through the animals claw, a probe attached to the animal via a low voltage cable (109) and soft-touch styled alligator clip (110), and a dedicated microprocessor circuit (described elsewhere). In this embodiment, the change in low voltage return signal indicates the presence of the animal's quick and where it terminates.

The terms a or an, as used herein, are defined as one or more than one unless the context requires otherwise. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically.

The appended claims are not to be interpreted as including means-plus-function limitations, unless such a limitation is explicitly recited in a given claim using the phrase(s) "means for" and/or "step for." Subgeneric embodiments of the invention are delineated by the appended independent claims and their equivalents. Specific embodiments of the invention are differentiated by the appended dependent claims and their equivalents.

What is claimed is:

1. A claw quick detection device, comprising:
   a claw cutting means; and
   a positioning system for properly positioning the claw cutting means, such that an animal's claw is not cut in its quick, the positioning system comprising
   a scan sensor;
   a marking device; and
   a control circuit coupled to the scan sensor and coupled to the marking device, the control circuit controlling the scan sensor for performing a scan operation and determining a position status.

2. The claw quick detection device of claim 1, wherein the scan sensor is an infrared scan system.

3. The claw quick detection device of claim 1, wherein the scan sensor is a high intensity light source scan system.

4. The claw quick detection device of claim 1, wherein the scan sensor is an ultrasonic scan system.

5. The claw quick detection device of claim 1, wherein the scan sensor is a pulse oximetery scan system.

6. The claw quick detection device of claim 1, wherein the scan sensor is a coherent light source scan system.

7. The claw quick detection device of claim 1, wherein the scan sensor is an infared thermometer scan system.

8. The claw quick detection device of claim 1, wherein the control circuit includes a microprocessor.

9. The claw quick detection device of claim 1, further comprising a pick-up source, coupled to the scan sensor.

10. A method to assist an operator in properly cutting an animal's claw, the method comprising:
    the operator positioning a claw quick detection device over the claw at a first position;
    scanning the claw to determine the position of the claw cutter relative to the quick of the claw;
    marking the claw at a position that does not extend into the quick of the claw.

11. The method of claim 10 further comprising:
    the operator cutting the claw at the marked position.

* * * * *